United States Patent
Iizuka

(10) Patent No.: US 9,571,201 B2
(45) Date of Patent: Feb. 14, 2017

(54) TRANSMISSION APPARATUS, LINE CARD AND CONTROL METHOD OF TRANSMISSION APPARATUS

(71) Applicant: FUJITSU LIMITED, Kawasaki-shi, Kanagawa (JP)

(72) Inventor: Hiroshi Iizuka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/921,253

(22) Filed: Oct. 23, 2015

(65) Prior Publication Data

US 2016/0142146 A1 May 19, 2016

(30) Foreign Application Priority Data

Nov. 18, 2014 (JP) .................. 2014-233870

(51) Int. Cl.
| | |
|---|---|
| H04B 10/40 | (2013.01) |
| H04B 10/80 | (2013.01) |
| H04L 29/06 | (2006.01) |

(52) U.S. Cl.
CPC ............. H04B 10/40 (2013.01); H04B 10/80 (2013.01); H04L 69/22 (2013.01)

(58) Field of Classification Search
CPC .......................... H04B 10/40; H04B 10/079
See application file for complete search history.

(56) References Cited

U.S. PATENT DOCUMENTS

2004/0208514 A1* 10/2004 Zhang ............... H04B 10/0795
398/25
2010/0020859 A1 1/2010 Suwada

FOREIGN PATENT DOCUMENTS

JP 2010-34777 2/2010

* cited by examiner

*Primary Examiner* — Shi K Li
(74) *Attorney, Agent, or Firm* — Staas & Halsey LLP

(57) ABSTRACT

A transmission apparatus includes: a module configured to receive and transmit data externally, the data received and to be transmitted being transferred via an interface internally; a framer configured to process transmission and reception of the data processed by the module; a transmission channel on which predetermined data is transmitted and received to and from the framer; and a controller configured to determine a combination of setting values for transmission and reception in accordance with a surrounding environment of the transmission channel, based on an error rate when the predetermined data is transmitted and received for each combination of setting values for transmission and reception on the transmission channel, and to perform setting for transmission and reception via the interface, based on the determined combination of setting values for transmission and reception.

7 Claims, 11 Drawing Sheets

FIG. 4

| EQ | | a | b | c | d | e | f | g | h | i | j | k |
|---|---|---|---|---|---|---|---|---|---|---|---|---|
| | A | 1E-10 | 1E-11 | 1E-11 | 1E-11 | 1E-11 | 1E-11 | 1E-11 | 1E-11 | 1E-11 | 1E-11 | 1E-11 |
| | B | 1E-10 | 1E-11 | 1E-11 | 1E-11 | 1E-11 | 1E-11 | 1E-11 | 1E-11 | 1E-11 | 1E-11 | 1E-11 |
| | C | 1E-10 | 1E-11 | 1E-11 | 1E-11 | 1E-11 | 1E-11 | 1E-11 | 1E-11 | 1E-11 | 1E-11 | 1E-11 |
| | D | 1E-10 | 1E-11 | 1E-12 | 1E-12 | 1E-12 | 1E-12 | 1E-12 | 1E-12 | 1E-12 | 1E-12 | 1E-11 |
| | E | 1E-10 | 1E-11 | 1E-12 | 1E-12 | 1E-12 | 1E-12 | 1E-12 | No Error | 1E-12 | 1E-12 | 1E-11 |
| | F | 1E-10 | 1E-11 | 1E-12 | 1E-12 | 1E-12 | No Error | No Error | No Error | 1E-12 | 1E-12 | 1E-11 |
| | G | 1E-10 | 1E-11 | 1E-12 | 1E-12 | 1E-12 | No Error | No Error | No Error | 1E-12 | 1E-12 | 1E-11 |
| | H | 1E-10 | 1E-11 | 1E-12 | 1E-12 | 1E-12 | 1E-12 | 1E-12 | 1E-12 | 1E-12 | 1E-12 | 1E-11 |
| | I | 1E-10 | 1E-11 | 1E-11 | 1E-11 | 1E-11 | 1E-11 | 1E-11 | 1E-11 | 1E-11 | 1E-11 | 1E-11 |
| | J | 1E-10 | 1E-11 | 1E-10 | 1E-10 | 1E-10 | 1E-10 | 1E-10 | 1E-10 | 1E-10 | 1E-10 | 1E-10 |
| | K | 1E-10 | 1E-10 | 1E-10 | 1E-10 | 1E-10 | 1E-10 | 1E-10 | 1E-10 | 1E-10 | 1E-10 | 1E-10 |

FIG. 6

| MONITOR OPTIMAL VALUE | | MODULE TYPE | | | | | | | |
|---|---|---|---|---|---|---|---|---|---|
| | | TypeA | | TypeB | | TypeC | | ... | TypeZ |
| EMPHASIS | EQ | EMPHASIS | EQ | EMPHASIS | EQ | EMPHASIS | EQ | ... | EMPHASIS | EQ |
| a | A | MONITOR OPTIMAL VALUE − TypeA OPTIMAL VALUE | | MONITOR OPTIMAL VALUE − TypeB OPTIMAL VALUE | | MONITOR OPTIMAL VALUE − TypeC OPTIMAL VALUE | | ... | MONITOR OPTIMAL VALUE − TypeZ OPTIMAL VALUE |
| a | B | | | | | | | ... | |
| a | C | | | | | | | ... | |
| ... | ... | | | | | | | ... | |
| a | K | | | | | | | ... | |
| b | A | | | | | | | ... | |
| b | B | | | | | | | ... | |
| b | C | | | | | | | ... | |
| ... | ... | | | | | | | ... | |
| ... | ... | | | | | | | ... | |
| k | I | | | | | | | ... | |
| k | J | | | | | | | ... | |
| k | K | | | | | | | ... | |

D2

TRANSMISSION APPARATUS, LINE CARD AND CONTROL METHOD OF TRANSMISSION APPARATUS

CROSS-REFERENCE TO RELATED APPLICATION

This application is based upon and claims the benefit of priority of the prior Japanese Patent Application No. 2014-233870, filed on Nov. 18, 2014, the entire contents of which are incorporated herein by reference.

FIELD

The embodiments discussed herein are related to a transmission apparatus, a line card, and a control method of the transmission apparatus.

BACKGROUND

In recent years, for transmission apparatuses, due to increase in traffic through the Internet, and the like, increase in data capacity, reduction in size of devices, and cost reduction are desired to be achieved. In order to achieve increase in data capacity, reduction in size of devices, and cost reduction, a wide variety of optical pluggable modules (which will be hereinafter referred to as modules) in accordance with a transmission distance and a status of support for an internal function, or the like, have been developed. A transmission apparatus is configured such that a predetermined module is mounted on each line card in the apparatus, and thus, corresponds to a desired specification. Interfaces of various different transmission rates are used for the modules, and data transmission is realized in the line cards via the interfaces.

FIG. 11 and FIG. 12 are block diagrams illustrating related art examples of a line card. As illustrated in FIG. 11, a line card 600 includes a CFP module 601 (CFP: 100 G form-factor pluggable, the c stands for the Latin letter used for expressing the number of 100), a framer 602, an electrical interface 603, a card controller 604, and a connection connector 605. The line card 600 has a transmission capacity corresponding to 100 Gbps×2 ports, which is realized by the two CFP modules 601. A signal externally input in each of the CFP module 601 is processed in the corresponding framer 602 via the corresponding electrical interface 603. In this case, the electrical interface 603 has a configuration of 11.18 Gbps×10 lanes at a rate of OUT-4 (optical transport unit 4).

As illustrated in FIG. 12, a line card 700 includes a CFP2 module 701, a framer 702, a gear box 703, an electrical interface 704, an electrical interface 705, a card controller 706, and a connection connector 707. Similar to the line card 600, the line card 700 has a transmission capacity corresponding to 100 Gbps×2 ports, which is realized by the two CFP2 modules 701. In the line card 700, the gear box 703 configured to change 28 Gbps×4 lanes to 11.18 Gbps×10 lanes is provided between each of the CFP2 module 701 and the corresponding framer 702. A signal externally input in the CFP2 module 701 is input to the corresponding gear box 703 via the electrical interface 704 of 28 Gbps×4 lanes, and then, is transmitted from the gear box 703 to the framer 702 via the corresponding electrical interface 705 of 11.18 Gbps×10 lanes.

In the electrical interface 603 of the line card 600 and the electrical interfaces 704 and 705 of the line card 700, in order not to cause bit error generation, characteristic optimization for a transmission device (for example, the CFP module 601 in the line card 600, or the like) and a reception device (for example, the framer 602 in the line card 600 or the like) is performed. In the characteristic optimization, the characteristic of the transmission device, the characteristic of the reception device, and the characteristic of a transmission channel between the transmission device and the reception device are modeled, and setting values for the transmission device and the reception device are determined by simulation using the model, or the like. For example, examples of a setting value for the transmission device include an amplitude value of a transmission output, a pre/post-emphasis value, and the like. Examples of a setting value for the reception device include an equalizer gain value, and the like.

Validity of a setting value for the transmission device and a setting value for the reception device, which have been derived by the above-described simulation, is checked by real machine verification in which the setting values are actually set to the transmission device and the reception device and an error rate is checked, or the like. After the validity is confirmed, the setting values are set to the line cards 600 and 700 and thus an operation is performed, so that the generation of a bit error is not caused in the line cards 600 and 700, and stable signal transmission is realized.

Japanese Laid-open Patent Publication No. 2010-34777 discusses a related art example.

Incidentally, the characteristic of a transmission channel between the transmission device and the reception device changes due to an external (surrounding) environment, such as a temperature and a humidity on the transmission channel. FIG. 13 is a chart illustrating the characteristic of a transmission channel. In FIG. 13, the ordinate axis indicates the magnitude (MAGNITUDE) of a transmission channel loss. The abscissa axis indicates a frequency (FREQUENCY) at transmission and also a transmission speed (a transmission rate) on the transmission channel. Graphs G1 and G2 indicate the characteristic of the transmission channel (the transmission speed–the transmission channel loss) in different external environments.

As illustrated in FIG. 13, values at frequencies F1 and F2 differ between the graphs G1 and G2 and, when the external environment differs, the characteristic of the transmission channel changes. As the transmission speed increases (the frequency F1 to the frequency F2), the transmission channel loss greatly increases, so that the change in characteristic of the transmission channel due to the change in external environment increases.

SUMMARY

According to an aspect of the invention, a transmission apparatus includes: a module configured to receive and transmit data externally, the data received and to be transmitted being transferred via an interface internally; a framer configured to process transmission and reception of the data processed by the module; a transmission channel on which predetermined data is transmitted and received to and from the framer; and a controller configured to determine a combination of setting values for transmission and reception in accordance with a surrounding environment of the transmission channel, based on an error rate when the predetermined data is transmitted and received for each combination of setting values for transmission and reception on the transmission channel, and to perform setting for transmission and reception via the interface, based on the determined combination of setting values for transmission and reception.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a table illustrating characteristic information for a monitor transmission channel;

FIG. 6 is a table illustrating a parameter conversion table for each module type;

DESCRIPTION OF EMBODIMENTS

Figure 1:
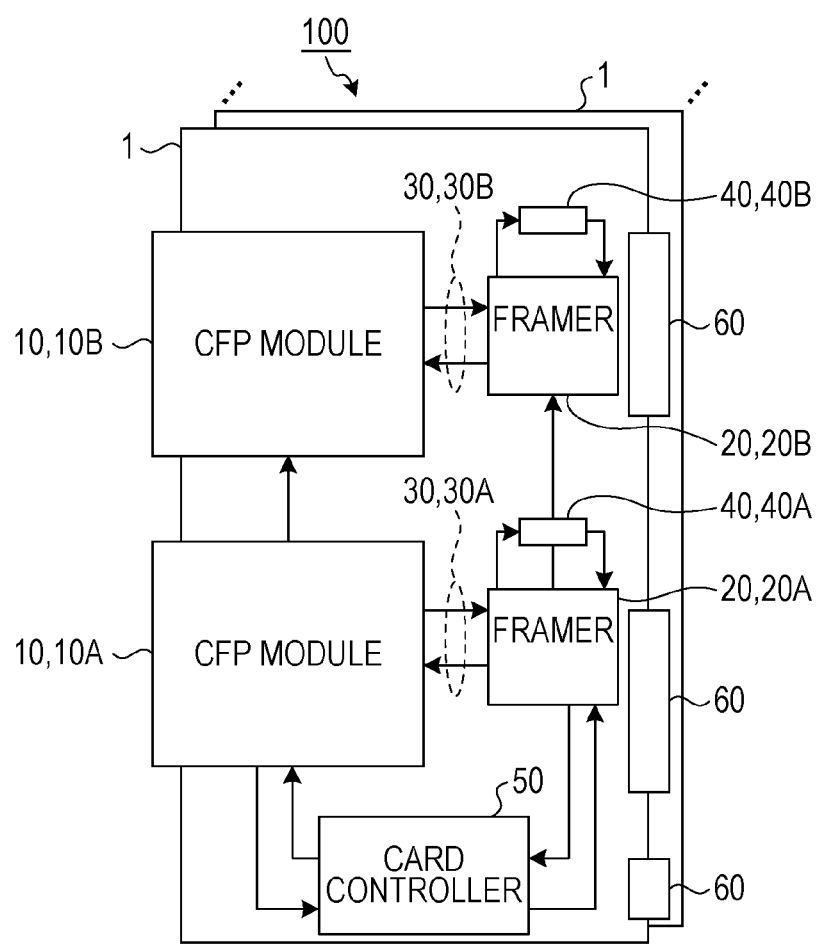
FIG. 1 is a block diagram illustrating a configuration of a transmission apparatus according to a first embodiment.

As the transmission speed increases, the transmission loss greatly increases, and accordingly, acceptable ranges (a range in which there is not any error) of a setting value for a transmission device and a setting value for a reception device are narrowed. Also, as the transmission speed increases, a change in characteristic of a transmission channel due to a change in external environment increases, and accordingly, an influence of the change in external environment on the setting value for the transmission device and the setting value for the reception device increases. Therefore, in order not to cause bit error generation due to a change in external environment, the external environment is monitored, and setting values in accordance with a change in the external environment are desired to be set for the transmission device and the reception device.

However, as for the change in external environment, there are many factors including not only changes in temperature and humidity but also a change in wind velocity (a change in cooling effect) due to control of a fan in a device and changes in temperature distributions in the line cards 600 and 700. Therefore, it has not been easy to monitor all of the factors with many sensors, such as a temperature sensor, a humidity sensor, and the like, and to set a setting value for the transmission device and a setting value for the reception device, based on values obtained by the sensors. Thus, it has been difficult not to cause bit error generation and realize stable signal transmission by collectively monitoring the change in external environment and a setting value for the transmission device and a setting value for the reception device in accordance with the change in external environment.

A transmission apparatus, a line card, and a control method according to an embodiment, which may realize stable signal transmission, will be described below with reference to the accompanying drawings. In the following embodiments, parts which have the same function are denoted by the same reference character, and the overlapping description will be omitted. Note that a transmission apparatus, a line card, and a control method described in the following embodiments are merely examples, and the embodiments are not limited thereto. Moreover, the following embodiments may be combined, as appropriate, in a range that does not cause contradiction.

First Embodiment

FIG. 1 is a block diagram illustrating a configuration of a transmission apparatus 100 according to a first embodiment. As illustrated in FIG. 1, the transmission apparatus 100 is configured so as to be coupled to a connector (not illustrated) of a back board (a back wire board (BWB)), and thus, accommodate a plurality of line cards 1 therein.

The line card 1 is configured such that, for example, two modules, that is, CFP modules 10A and 10B, may be mounted therein. Specifically, the line card 1 includes, as a configuration related to the CFP module 10A, a framer 20A, an electrical interface 30A, and a monitor transmission channel 40A. The line card 1 includes, as a configuration related to the CFP module 10B, a framer 20B, an electrical interface 30B, and a monitor transmission channel 40B. The line card 1 includes a card controller 50 configured to perform operation control and a connection connector 60 configured to provide a connection with a back board.

Note that the configurations related to the two CFP modules 10A and 10B are the same between the two CFP modules 10A and 10B. Therefore, unless specifically distinguished, the configurations will be described as CFP modules 10, framers 20, electrical interfaces 30, and monitor transmission channels 40.

The CFP module 10 is removably coupled to the framer 20 via the electrical interface 30 of 11.18 Gbps×10 lanes and, when the CFP module 10 is attached, transmission and reception of data via the electrical interface 30 is enabled. The framer 20 establishes frame synchronization from an electrical signal input from the CFP module 10 via the electrical interface 30 and thereby performs predetermined processing in unit of frames for the electrical signal.

In order to monitor an external environment, the monitor transmission channel 40 configured to transmit and receive predetermined data is coupled to the framer 20. Information of a pattern wiring length, a loss medium, and a reflecting medium that correspond to the electrical interface 30 provided between the CFP module 10 and the framer 20 may be included in the monitor transmission channel 40. The CFP module 10 and the framer 20 are coupled to the card controller 50 and are controlled by the card controller 50.

Figure 2:
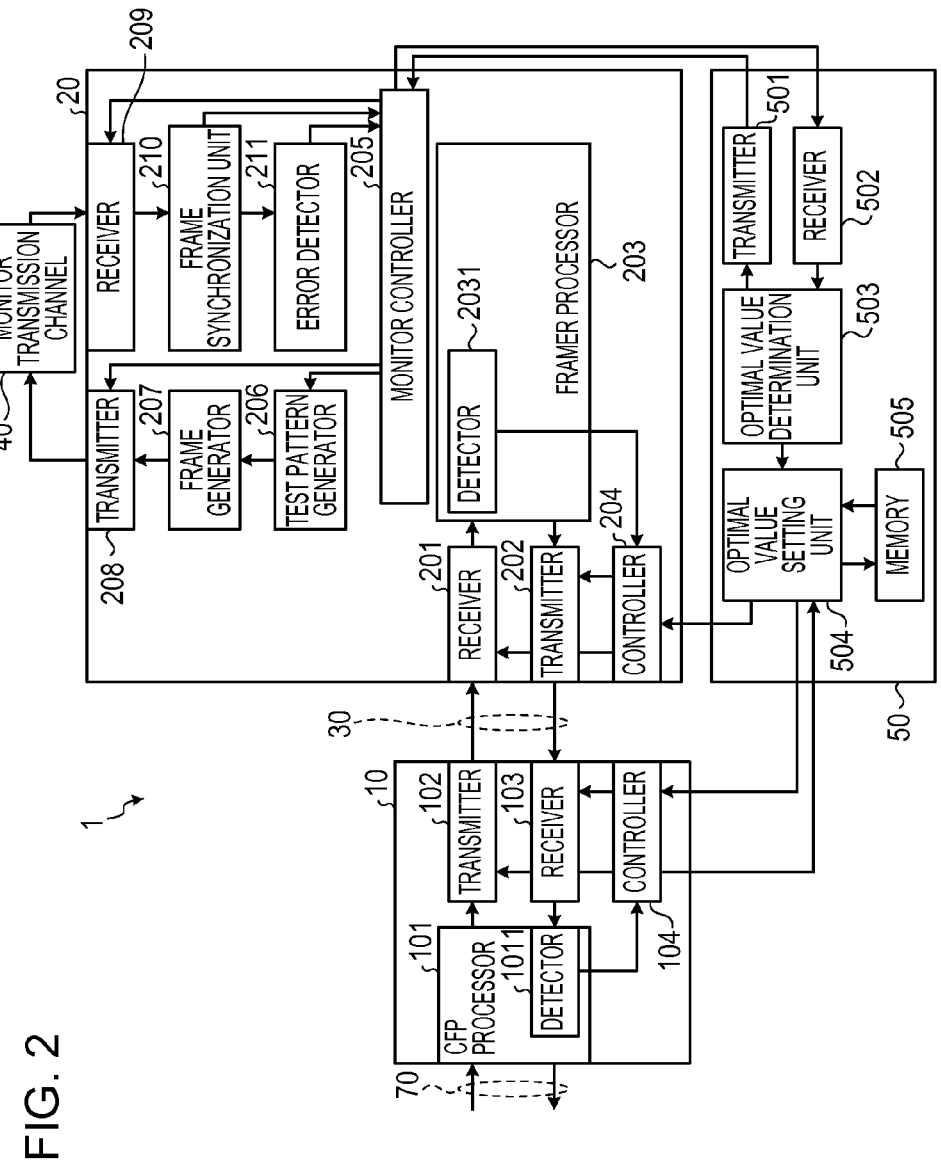
FIG. 2 is a block diagram illustrating a configuration of a line card according to the first embodiment.

FIG. 2 is a block diagram illustrating a configuration of the line card 1 according to the first embodiment. Note that, in FIG. 2, parts of the CFP module 10 and the framer 20 which correspond to one port are illustrated. As illustrated in FIG. 2, the CFP module 10 includes a CFP processor 101, a transmitter 102, a receiver 103, and a controller 104.

The CFP processor 101 processes transmission and reception of data via an optical interface 70 of a 100 Gbps port. Specifically, the CFP processor 101 outputs data received via the optical interface 70 to the transmitter 102. The CFP processor 101 outputs data received from the receiver 103 to the outside via the optical interface 70.

The CFP processor 101 also includes a detector 1011. The detector 1011 detects reception condition (for example, reception strength, or the like) and reception quality (for example, a bit error, or the like) of the receiver 103. The detector 1011 outputs the detected reception condition and reception quality to the controller 104.

The transmitter 102 converts the data output from the CFP processor 101 to an electrical signal, and transmits the electrical signal to the framer 20 via the electrical interface 30. In the transmitter 102, under control of the card controller 50 via the controller 104, setting of an amplitude value (Vod) of a transmission output, a pre/post-emphasis (which will be hereinafter referred to as emphasis) value, and the like, which is performed in transmitting an electrical signal to the framer 20, is performed.

The receiver 103 receives the electrical signal from the electrical interface 30, converts the electrical signal to data, and outputs the data to the CFP processor 101. In the receiver 103, under control of the card controller 50 via the controller 104, setting of an equalizer gain (which will be hereinafter referred to as equalizer or EQ) value, and the like, which is performed in receiving an electrical signal from the electrical interface 30, is performed.

The controller 104 performs monitoring and control of the CFP processor 101, the transmitter 102, and the receiver 103. For example, the controller 104 outputs the reception state and the reception quality that have been detected by the detector 1011 to the card controller 50. The controller 104 sets the amplitude value (Vod) of a transmission output and the emphasis value, which have been reported from the card controller 50, to the transmitter 102. The controller 104 sets the equalizer value, which has been reported from the card controller 50, to the receiver 103.

The framer 20 includes a receiver 201, a transmitter 202, a framer processor 203, and controller 204, and processes transmission and reception of data performed by the CFP module 10. The framer 20 includes a monitor controller 205, a test pattern generator 206, a frame generator 207, a transmitter 208, a receiver 209, a frame synchronization unit 210, and an error detector 211, and causes the monitor transmission channel 40 to transmit and receive predetermined data.

The receiver 201 receives the electrical signal from the electrical interface 30, converts the electrical signal to data, and outputs the data to the framer processor 203. In the receiver 201, under control of the card controller 50 via the controller 204, setting of an equalizer gain value, and the like, which is performed in receiving an electrical signal from the electrical interface 30, is performed.

The transmitter 202 converts the data output from the framer processor 203 to an electrical signal, and transmits the electrical signal to the CFP module 10 via the electrical interface 30. In the transmitter 202, under control of the card controller 50 via the controller 204, setting of the amplitude value (Vod) of a transmission output, the emphasis value, and the like, which is performed in transmitting an electrical signal to the CFP module 10, is performed.

The framer processor 203 establishes frame synchronization for data received from the CFP module 10 via the electrical interface 30 and thereby performs predetermined processing in unit of frames. The framer processor 203 performs processing, such as frame generation for data that is transmitted to the CFP module 10 via the electrical interface 30.

The framer processor 203 includes a detector 2031. The detector 2031 detects reception condition (for example, reception strength, or the like) and reception quality (for example, a bit error, or the like) of the receiver 201. The detector 2031 outputs the detected reception strength and reception quality to the controller 204.

The controller 204 performs monitoring and control of the receiver 201, the transmitter 202, and the framer processor 203. For example, the controller 204 outputs the reception state and the reception quality that have been detected by the detector 2031 to the card controller 50. The controller 204 sets the amplitude value (Vod) of a transmission output and the emphasis value, which have been reported from the card controller 50, to the transmitter 202. The controller 204 sets the equalizer value, which has been reported from the card controller 50, to the receiver 201.

The monitor controller 205 controls transmission and reception of predetermined data in the monitor transmission channel 40. Specifically, the monitor controller 205 instructs the test pattern generator 206 to generate a predetermined test pattern, and causes transmission and reception of data including the test pattern via the monitor transmission channel 40. The monitor controller 205 performs, based on information received from the card controller 50, setting for the transmitter 208 and the receiver 209. When the monitor controller 205 causes transmission and reception of the test pattern generated by the test pattern generator 206 to be performed via the monitor transmission channel 40, the monitor controller 205 outputs information detected by the error detector 211 to the card controller 50.

The test pattern generator 206 is a generation source of data that is transmitted to the monitor transmission channel 40, generates, under control of the monitor controller 205, a predetermined test pattern, and outputs the predetermined test pattern to the frame generator 207. The frame generator 207 generates a frame including the test pattern output from the test pattern generator 206, and outputs the frame to the transmitter 208. Specifically, the frame generator 207 adds a pattern for frame synchronization to the test pattern output from the test pattern generator 206 to generate a frame.

The transmitter 208 converts the data (the frame) output from the frame generator 207 to an electrical signal, and transmits the electrical signal to the receiver 209 via the monitor transmission channel 40. In the transmitter 208, under control of the card controller 50 via the monitor controller 205, setting of the amplitude value (Vod) of a transmission output, the emphasis value, and the like, which is performed in transmitting an electrical signal, is performed.

The receiver 209 receives the electrical signal from the monitor transmission channel 40, converts the electrical signal to data (a frame), and outputs the data to the frame synchronization unit 210. In the receiver 209, under control of the card controller 50 via the monitor controller 205, setting of the equalizer gain value, and the like, which is performed in receiving an electrical signal, is performed.

The frame synchronization unit 210 performs, based on the pattern for frame synchronization included in the frame received by the receiver 209, frame synchronization. The error detector 211 performs error check of a test pattern included in a frame on which synchronization check has been performed, and detects whether or not there is an error, such as a bit error and the like. The error check performed in the error detector 211 may be not only error check based on frame check sequence (FCS) in a frame or the like, but also error check performed by comparison with an existing test pattern generated by the test pattern generator 206. The error detector 211 outputs, as a detection result, information on whether or not there is an error, such as a bit error and the like, to the monitor controller 205.

The card controller 50 includes a transmitter 501, a receiver 502, an optimal value determination unit 503, an optimal value setting unit 504, and a memory 505.

The transmitter 501 transmits setting values that have been output from the optimal value determination unit 503 and are set to the transmitter 208 and the receiver 209 to the monitor controller 205. The setting value that is set to the transmitter 208 is, for example, the amplitude value (Vod) of a transmission output, the emphasis value, or the like. The setting value that is set to the receiver 209 is, for example, an equalizer value, or the like.

The receiver 502 receives the information output from the monitor controller 205, and outputs the information to the optimal value determination unit 503. For example, the information output from the monitor controller 205 to the receiver 502 is information detected by the error detector 211 when transmission and reception of a test pattern via the monitor transmission channel 40 is caused to be performed, or the like.

The optimal value determination unit 503 determines a combination of setting values for transmission and reception in the monitor transmission channel 40, that is, a combination of setting values that are set to the transmitter 208 and the receiver 209, and reports the combination to the monitor controller 205. Then, the optimal value determination unit 503 determines, based on information detected by the error detector 211 when data is transmitted and received via the monitor transmission channel 40 with the reported setting values, a combination of setting values for transmission and reception in accordance with a surrounding environment of the monitor transmission channel 40. Specifically, the optimal value determination unit 503 obtains an error rate for each combination of setting values that are set to the transmitter 208 and the receiver 209, based on information on whether or not there is an error, such as a bit error, and the like, which has been detected by the error detector 211. Then, the optimal value determination unit 503 determines a combination of setting values that are set to the transmitter 208 and the receiver 209, with which an error rate when data is transmitted and received via the monitor transmission channel 40 is reduced, that is, a combination of optimal values (optimal points).

The optimal value setting unit 504 performs, based on the combination of optimal values determined by the optimal value determination unit 503, setting for transmission and reception in the electrical interface 30. Specifically, the optimal value setting unit 504 converts the determined setting values for the transmitter 208 and the receiver 209, based on a conversion table (see FIG. 6) used for converting the setting values to setting for transmission and reception of the electrical interface 30. Thus, the optimal value determination unit 503 obtains setting values for the transmitter 102 and the receiver 103 of the CFP module 10 and setting values for the receiver 201 and the transmitter 202 of the framer 20. Then, the optimal value setting unit 504 reports the retting values for the transmitter 102 and the receiver 201 used for transmitting data from the CFP module 10 to the framer 20 to the transmitter 102 and the receiver 201 via the controllers 104 and 204. The optimal value setting unit 504 reports the setting values for the receiver 103 and the transmitter 202 used for transmitting data from the framer 20 to the CFP module 10 to the receiver 103 and the transmitter 202 via the controllers 104 and 204.

The memory 505 stores various types of information, such as a conversion table used for converting the setting values for the transmitter 208 and the receiver 209 to setting for transmission and reception of the electrical interface 30, and the like.

Figure 3:
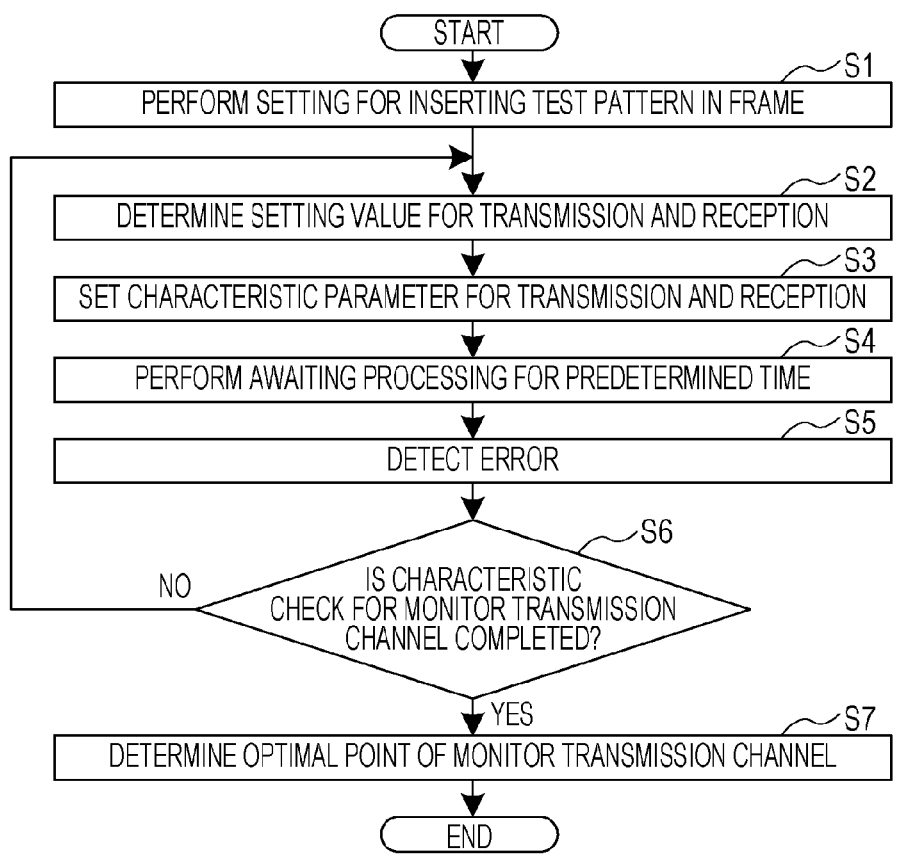
FIG. 3 is a flow chart illustrating an example of an operation of a line card according to the first embodiment.

FIG. 3 is a flow chart illustrating an example of an operation of the line card 1 according to the first embodiment. Specifically, FIG. 3 is a flow chart illustrating processing of determining a combination of optimal values in the optimal value determination unit 503 in detail. Processing of the flow chart may be periodically executed in predetermined time intervals, and may be consecutively executed in the optimal value determination unit 503 such that a combination of the latest optimal values may be obtained in accordance with a change in surrounding environment of the monitor transmission channel 40.

As illustrated in FIG. 3, when processing is started, insertion setting performed for inserting a predetermined test pattern in a frame is performed in the monitor controller 205 (51). Specifically, the monitor controller 205 instructs the test pattern generator 206 to generate a predetermined test pattern. Thus, in the monitor transmission channel 40, a frame including a test pattern is transmitted and received.

Next, the optimal value determination unit 503 determines setting values for transmission and reception in the monitor transmission channel 40 (a combination of setting values that are set to the transmitter 208 and the receiver 209) (S2). For example, assume that an acceptable setting range of the emphasis value of the transmitter 208 is a to k, and an acceptable setting range of the EQ value of the receiver 209 is A to K. In this case, the optimal value determination unit 503 determines a combination of one of the emphasis values a to k and one of the EQ values A to K. As an example, the optimal value determination unit 503 determines a combination of the emphasis value=a and the EQ value=A.

Subsequently, the optimal value determination unit 503 sets the setting values for transmission and reception in the monitor transmission channel 40, which have been determined in S2, as characteristic parameters for transmission and reception in the monitor transmission channel 40 (S3). Specifically, the optimal value determination unit 503 sets the emphasis value in the determined combination to the transmitter 208, and the EQ value therein to the receiver 209. Thus, in the monitor transmission channel 40, transmission and reception of a frame including a test pattern is performed with the emphasis value and the EQ value, which have been set.

Subsequently, the optimal value determination unit 503 performs awaiting processing for a predetermined time in order to obtain an error rate, based on information on whether or not there is an error, such as a bit error and the like, which has been detected by the error detector 211 (S4). Specifically, the optimal value determination unit 503 waits for a time in which a bit error rate (BER)≤1E-12 may be monitored.

Subsequently, the optimal value determination unit 503 detects, based on the information detected by the error detector 211, an error when transmission and reception of a frame including a test pattern is performed with the emphasis value and the EQ value, which have been set, in the monitor transmission channel 40 (S5). The optimal value determination unit 503 obtains a bit error rate by continuing the error detection during the awaiting processing.

Subsequently, the optimal value determination unit 503 determines whether or not check of the characteristic of the monitor transmission channel 40 is completed (S6). Specifically, the optimal value determination unit 503 determines whether or not a bit error rate has been obtained for each of all of combinations of setting values in the acceptable setting ranges of the transmitter 208 and the receiver 209.

If check of the characteristic of the monitor transmission channel 40 is not completed (NO in S6), there is a combination, among combinations of setting values in the acceptable setting ranges of the transmitter 208 and the receiver 209, for which a bit error rate has not been obtained, and therefore, the optimal value determination unit 503 causes the process to return to S2. For example, if a bit error rate for a combination of the emphasis value=a and the EQ value=A has been already obtained, in order to obtain bit error rates for the rest of the combinations, the process returns to S2. Then, when the process returns to S2 again, the optimal value determination unit 503 determines, as another combination, for example, the emphasis value=a and the EQ value=B, and continues processing. The optimal value determination unit 503 obtains a bit error rate for each of all of the combinations of setting values in the acceptable setting ranges of the transmitter 208 and the receiver 209 by continuing the processing of S2 to S6.

If check of the characteristic of the monitor transmission channel 40 is completed (YES in S6), the optimal value determination unit 503 determines an optical point of the monitor transmission channel 40 (S7). Specifically, the optimal value determination unit 503 determines, as an optimal value (the optimal point), a combination, among all of the combinations of setting values for the transmitter 208 and the receiver 209, with which an error rate is reduced (for example, to be a smallest value) among the obtained error rates for all of the combinations.

FIG. 4 is a table illustrating characteristic information D1 for the monitor transmission channel 40. As illustrated in FIG. 4, the characteristic information D1 is information of an error rate for each combination of a setting value in the acceptable setting range (EMPHASIS: a to k) for the transmitter 208 and a setting value in the acceptable setting range (EQ: A to K) for the receiver 209. The optimal value determination unit 503 obtains the characteristic information D1 by repeating the processing of S2 to S6.

The relationship of the error rate for each combination in the characteristic information D1 conforms with the surrounding environment in the monitor transmission channel 40. Specifically, characteristics in transmission and reception of the monitor transmission channel 40 change due to the surrounding environment in the monitor transmission channel 40 comprehensively including various factors, such as not only a temperature and a humidity but also a cooling effect due to control of a fan in a device, a temperature distribution in a device, and the like. Due to the characteristic change, the magnitudes and locations of a range R2 in which the error rate is 1E-12 and a range R1 in which the error rate is No Error fluctuate, and correspond to the surrounding environment.

Therefore, in S7, the setting values for the transmitter 208 and the receiver 209 that are suitable for the surrounding environment in the monitor transmission channel 40 are determined. For example, an emphasis value and an EQ value in the range R1 in which the error rate is lower than the error rate 1E-12 in the range R2 are determined as optimal values that are suitable for the surrounding environment in the monitor transmission channel 40. Furthermore, a median value (EMPHASIS: g, and EQ: F) for values in the range R1 may be determined as an optimal value and narrowing down of the optimal value may be performed.

The optimal value determination unit 503 may omit characteristic check in the electrical interface 30 provided between the CFP module 10 and the framer 20 by performing characteristic check in the monitor transmission channel 40 and obtaining a combination of optimal values. For example, if characteristic check is performed in the electrical interface 30, there is a condition to be satisfied, that is, as an error rate of a main signal, BER≤1E-12 is to be satisfied, and it takes a long monitoring time to check the single condition. Then, while checking the single condition, if BER≤1E-12 is not satisfied, transmission and reception of the main signal is influenced. Therefore, in system operation, it is difficult to perform setting in a short time. However, the optimal value determination unit 503 performs characteristic check in the monitor transmission channel 40 and thus obtains a combination of optimal values, so that there is no influence on the main signal between the CFP module 10 and the framer 20 and thus characteristic check may be performed during system operation.

Figure 5:
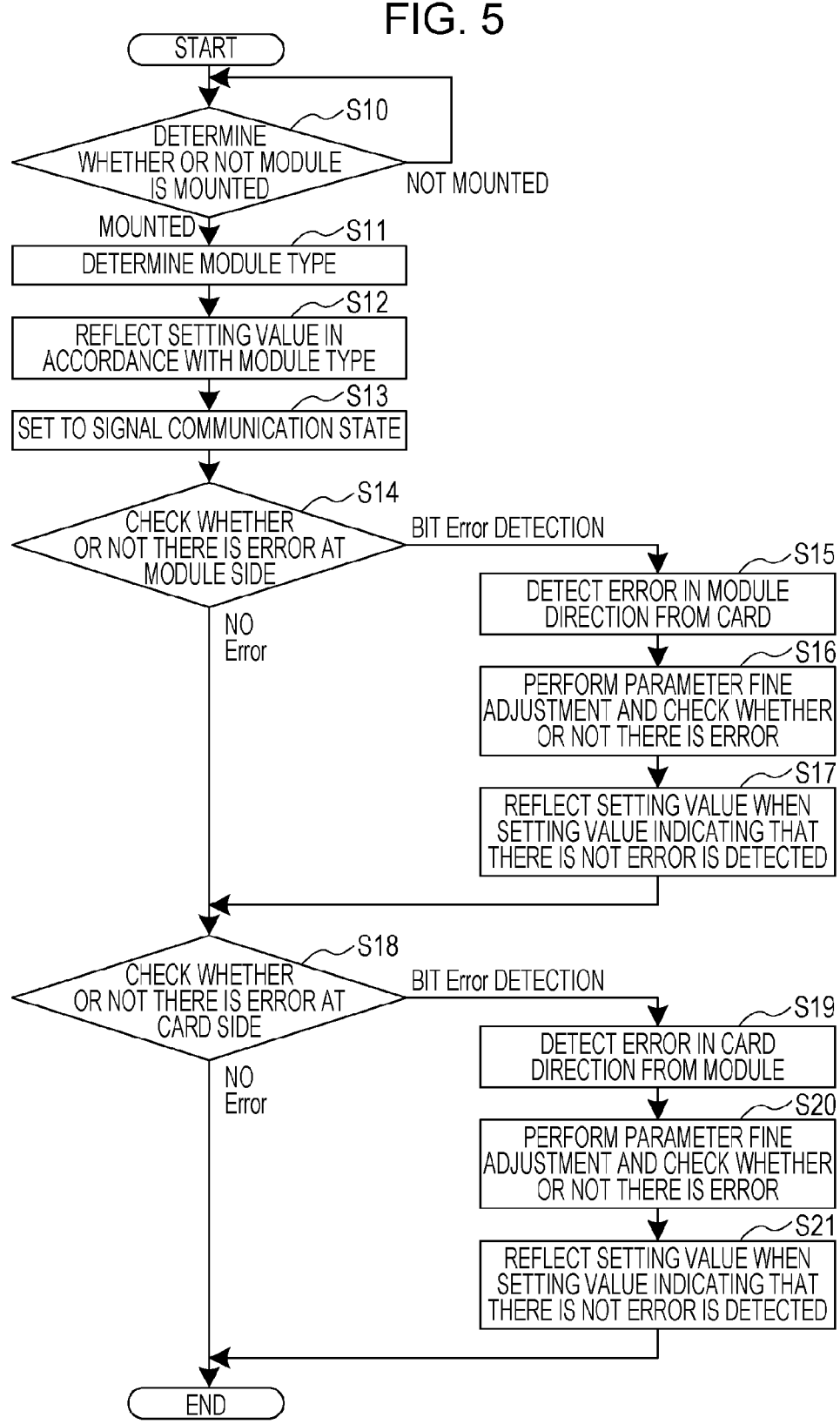
FIG. 5 is a flow chart illustrating an example of an operation of a line card according to the first embodiment.

FIG. 5 is a flow chart illustrating an example of an operation of the line card 1 according to the first embodiment. Specifically, FIG. 5 is a flow chart illustrating processing of performing setting for transmission and reception in the electrical interface 30 in the optimal value setting unit 504 in detail. Processing of the flow chart is, for example, consecutively executed in the optimal value setting unit 504 during an operation of the line card 1.

As illustrated in FIG. 5, when processing is started, the optimal value setting unit 504 determines whether or not the CFP module 10 is mounted through communication via the electrical interface 30, or the like (S10). For example, under regulations of CFP-multi-source agreement (MSA), there is a support for a remove signal used for module mounting determination. Therefore, the optimal value setting unit 504 is capable of determining whether or not the CFP module 10 is mounted by checking the state of the removal signal in communication via the electrical interface 30. If the CFP module 10 is not mounted, the optimal value setting unit 504 waits for processing.

If the CFP module 10 is mounted, the optimal value setting unit 504 determines the module type of the CFP module 10 through communication with the CFP module 10, or the like (S11). Specifically, the optimal value setting unit 504 collects physical inventory information from the CFP module 10. The optimal value setting unit 504 determines the module type of the CFP module 10, based on the collected physical inventory information.

Subsequently, the optimal value setting unit 504 reflects setting values for transmission and reception in the electrical interface 30 in accordance with the module type of the CFP module 10, based on a combination of optimal values determined by the optimal value determination unit 503 (S12). Specifically, with reference to the conversion table stored in the memory 505, the optimal value setting unit 504 obtains setting values for the transmitters 102 and 202 and the receivers 103 and 201 in accordance with the module type of the CFP module 10, based on the combination of optimal values determined by the optimal value determination unit 503. Then, the optimal value setting unit 504 sets the obtained values for the transmitters 102 and 202 and the receivers 103 and 201.

FIG. 6 is a table illustrating a parameter conversion table D2 for each module type. As illustrated in FIG. 6, the parameter conversion table D2 is table data used for obtaining setting values (EMPHASIS and EQ) for transmission and reception in accordance with the module type (Type A to Type Z), based on the combination of optimal values (monitor optimal values) determined by the optimal value determination unit 503. The above-described parameter conversion table D2 is stored in advance in the memory 505.

With reference to the parameter conversion table D2 stored in the memory 505, the optimal value setting unit 504 is capable of obtaining setting values (EMPHASIS and EQ) for transmission and reception in the electrical interface 30, which correspond to the surrounding environment of the monitor transmission channel 40. For example, assume that the monitor optimal values determined by the optimal value determination unit 503 are "EMPHASIS: g, and EQ: F", and the module type is "Type A". In this case, with reference to the parameter conversion table D2, the optimal value setting unit 504 obtains the emphasis value and the EQ value that correspond to the monitor optimal values "EMPHASIS: g, and EQ: F" and the module type "Type A". More specifically, the optimal value setting unit 504 obtains the emphasis values and the EQ values in the transmitters 102 and 202 and the receivers 103 and 201.

Subsequently, the optimal value setting unit 504 sets the transmitters 102 and 202 and the receivers 103 and 201 to a signal transmission state (S13). Thus, setting for transmission and reception in the electrical interface 30 is performed in accordance with the surrounding environment in the monitor transmission channel 40, and therefore, the line card 1 may realize stable signal transmission in which bit error generation is not caused. The setting for transmission and reception in the electrical interface 30 is setting in accordance with the module type, and therefore, even when various modules are mounted, the line card 1 may realize stable signal transmission.

Subsequently, the optimal value setting unit 504 performs processing (S14 to S21) of adjusting setting for transmission and reception in the electrical interface 30, based on an error rate when transmission and reception to and from the CFP module 10 are actually performed in performing setting for transmission and reception in the electrical interface 30.

Specifically, the optimal value setting unit 504 obtains a detection result of the detector 1011 of the CFP module 10 and checks whether or not there is an error at a CFP module 10 side (S14). If an error is not confirmed at the CFP module 10 side (No Error in S14), the optimal value setting unit 504 causes the process to proceed to S18. If an error is confirmed at the CFP module 10 side (BIT Error detection in S14), the optimal value setting unit 504 detects an error in transmitting data in a CFP module 10 direction from the line card 1 (S15).

Since the confirmed error is an error regarding transmission in the CFP module 10 direction from the line card 1, targets of parameter (setting value) adjustment are the receiver 103 and the transmitter 202. Therefore, the optimal value setting unit 504 performs parameter fine adjustment for the receiver 103 and the transmitter 202 and checks whether or not there is an error at the CFP module 10 side again (S16). For example, the parameter fine adjustment is adjustment to a value in a predetermined range using, as median values, the setting values for the receiver 103 and the transmitter 202 in S12. In S16, the optimal value setting unit 504 causes each of the values to consecutively fluctuate in the above-described predetermined range and checks whether or not there is an error at the CFP module 10 side.

Subsequently, if a setting value indicating that there is not an error is detected in checking on whether or not there is an error in S16, the optimal value setting unit 504 reports the setting value to the receiver 103 and the transmitter 202 and thus reflects the setting value (S17).

Subsequent to S14 and S17, the optimal value setting unit 504 obtains a detection result of the detector 2031 of the framer 20, and checks whether or not there is an error at a line card 1 side (S18). If an error is not confirmed at the line card 1 side (No Error in S18), the optimal value setting unit 504 ends processing. If an error is confirmed at the line card 1 side (BIT Error detection in S18), the optimal value setting unit 504 detects an error in transmitting data in a line card 1 direction from the CFP module 10 (S19).

Since the confirmed error is an error regarding transmission in the line card 1 direction from the CFP module 10, targets of parameter (setting value) adjustment are the transmitter 102 and the receiver 201. Therefore, the optimal value setting unit 504 performs parameter fine adjustment for the transmitter 102 and the receiver 201 and checks whether or not there is an error at the line card 1 side again (S20). For example, the parameter fine adjustment is adjustment to a value in a predetermined range using, as median values, the setting values for the transmitter 102 and the receiver 201 in S12. In S20, the optimal value setting unit 504 causes each of the values to consecutively fluctuate in the above-described predetermined range and checks whether or not there is an error at the line card 1 side.

Subsequently, if a setting value indicating that there is not an error is detected in checking on whether or not there is an error in S20, the optimal value setting unit 504 reports the setting value to the transmitter 102 and the receiver 201 and thus reflects the setting value (S21).

Due to the above-described processing of S14 to S21, the line card 1 may realize more stable signal transmission by performing fine adjustment of setting for transmission and reception in the electrical interface 30.

Second Embodiment

Figure 7:
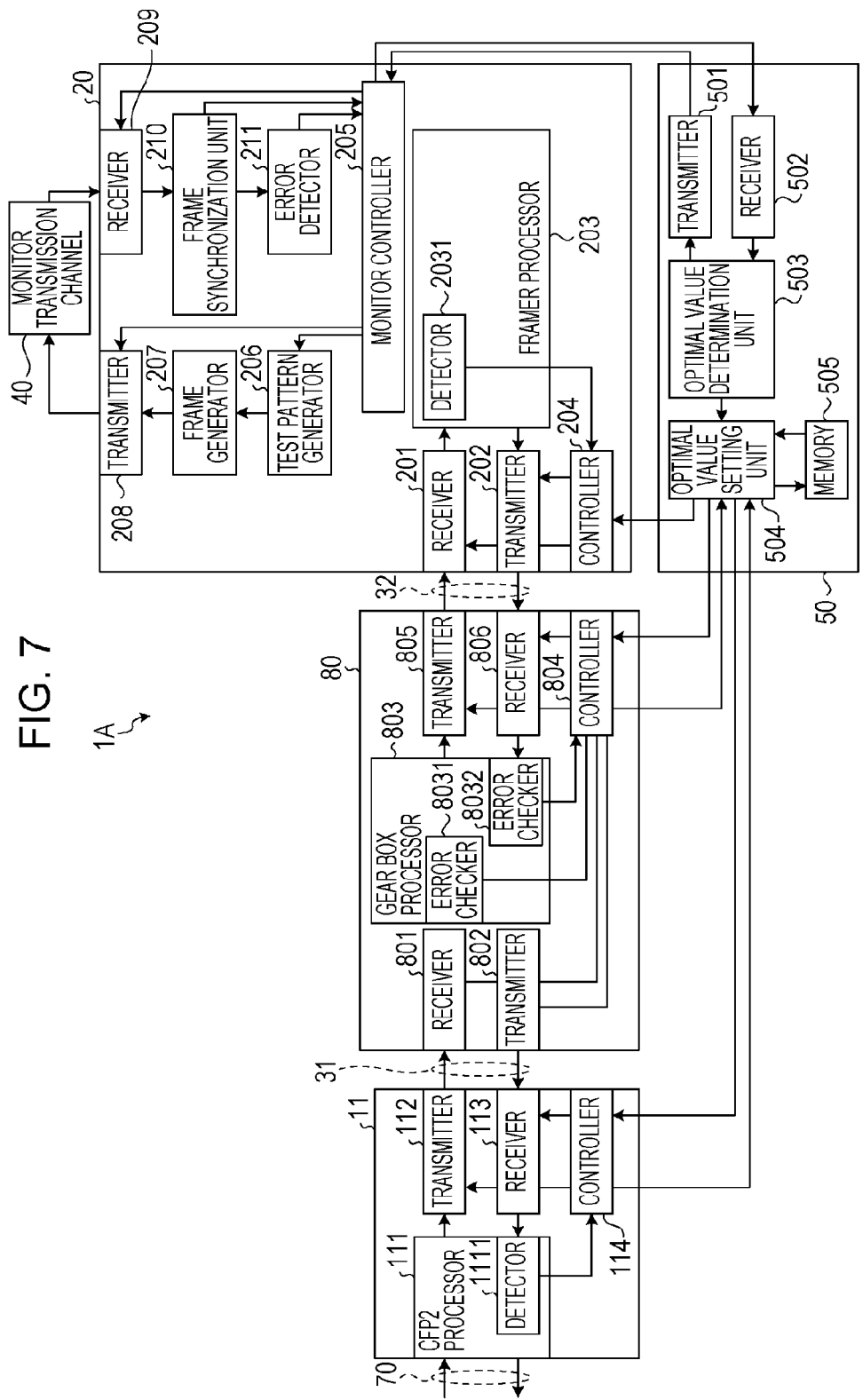
FIG. 7 is a block diagram illustrating a configuration of a line card according to a second embodiment.

FIG. 7 is a block diagram illustrating a configuration of a line card 1A according to a second embodiment. As illustrated in FIG. 7, the line card 1A corresponds to a configuration obtained by changing the CFP module 10 of the line card 1 according to the first embodiment to a CFP2 module 11. Specifically, the line card 1A includes a gear box 80 configured to relay transmission and reception to and from the CFP2 module 11. The CFP2 module 11 is removably coupled to the gear box 80 via an electrical interface 31 of 28 Gbps×4 lanes. The gear box 80 and the framer 20 are coupled to each other via an electrical interface 32 of 11.18 Gbps×10 lanes. Note that, in FIG. 7, parts of the CFP2 module 11, the gear box 80, and the framer 20 which correspond to one port are illustrated.

The CFP2 module 11 includes a CFP processor 111, a transmitter 112, a receiver 113, and a controller 114, and has a configuration that is substantially the same as that of the CFP module 10. The gear box 80 changes 28 Gbps×4 lanes to 11.18 Gbps×10 lanes. Specifically, the gear box 80 includes a receiver 801, a transmitter 802, a gear box processor 803, a controller 804, a transmitter 805, and a receiver 806.

The receiver 801 receives an electrical signal from the electrical interface 31, converts the electrical signal to data, and outputs the data to the gear box processor 803. In the receiver 801, under control of the card controller 50 via the controller 804, setting of an equalizer value, and the like, which is performed in receiving an electrical signal from the electrical interface 31, is performed.

The transmitter 802 converts the data output from the gear box processor 803 to an electric signal, and transmits the electrical signal to the CFP2 module 11 via the electrical interface 31. In the transmitter 802, under control of the card controller 50 via the controller 804, setting of an amplitude value (Vod) of a transmission output, an emphasis value, and the like, which is performed in transmitting an electrical signal to the CFP module 10, is performed.

The gear box processor 803 performs conversion processing between 28 Gbps×4 lanes and 11.18 Gbps×10 lanes. Specifically, the gear box processor 803 converts data from the receiver 801 and outputs the converted data to the transmitter 805. The gear box processor 803 converts data from the receiver 806 and outputs the converted data to the transmitter 802.

The gear box processor 803 includes error checkers 8031 and 8032. The error checker 8031 detects reception condition (for example, reception strength, or the like) and reception quality (for example, a bit error, or the like) of the receiver 801. The error checker 8031 outputs the detected reception condition and reception quality to the controller 804. The error checker 8032 detects reception condition (for example, reception strength, or the like) and reception quality (for example, a bit error, or the like) of the receiver 806. The error checker 8032 outputs the detected reception condition and reception quality to the controller 804.

The controller 804 performs monitoring and control of the transmitter 208, the transmitter 802, the gear box processor 803, the transmitter 805, and the receiver 806. For example, the controller 804 outputs the reception state and the reception quality that are detected by the error checkers 8031 and 8032 to the card controller 50. The controller 804 sets each amplitude value (Vod) of a transmission output and each emphasis value, which have been reported from the card controller 50 to the transmitter 802 or the transmitter 805, to the corresponding one of the transmitter 802 or the transmitter 805. The controller 804 sets each equalizer value, which has been reported from the card controller 50 to the receiver 801 or the receiver 806, to the corresponding one of the receiver 801 and the receiver 806.

The transmitter 805 converts the data output from the gear box processor 803 to an electrical signal, and transmits the electrical signal to the framer 20 via the electrical interface 32. In the transmitter 805, under control of the card controller 50 via the controller 804, setting of the amplitude value (Vod) of a transmission output, the emphasis value, and the like, which is performed in transmitting the electrical signal to the framer 20, is performed.

The receiver 806 receives the electrical signal from the electrical interface 32, converts the electrical signal to data, and outputs the data to the gear box processor 803. In the receiver 806, under control of the card controller 50 via the controller 804, setting of the equalizer value, and the like, which is performed in receiving an electrical signal from the electrical interface 32, is performed.

Figure 8:
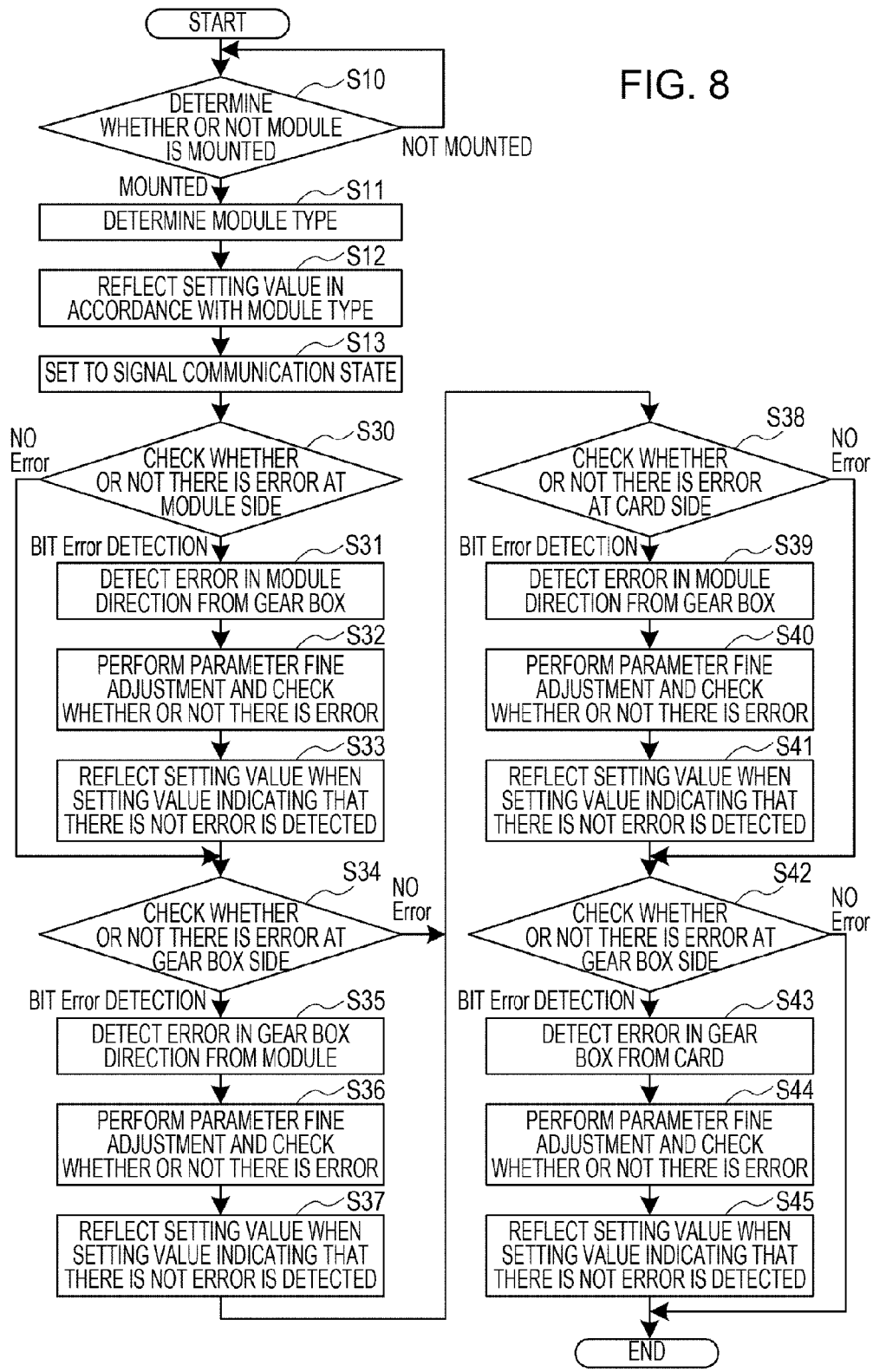
FIG. 8 is a flow chart illustrating an example of an operation of a line card according to the second embodiment.

Setting for transmission and reception in the electrical interfaces 31 and 32 in the optimal value setting unit 504 will be described below in detail. FIG. 8 is a flow chart illustrating an example of an operation of the line card 1A according to the second embodiment.

As illustrated in FIG. 8, for S10 to S13, similar processing to that of the first embodiment is performed. Specifically, when processing is started, the optimal value setting unit 504 determines whether or not the CFP2 module 11 is mounted through communication with the CFP2 module 11, or the like (S10). If the CFP2 module 11 is not mounted, the optimal value setting unit 504 waits for processing. If the CFP2 module 11 is mounted, the optimal value setting unit 504 determines the module type of the CFP2 module 11 through communication with the CFP2 module 11, or the like (S11).

Subsequently, the optimal value setting unit 504 reflects setting values for transmission and reception in the electrical interfaces 31 and 32 in accordance with the module type of the CFP2 module 11, based on a combination of optimal values determined by the optimal value determination unit 503 (S12).

Specifically, with reference to the parameter conversion table D2, the optimal value setting unit 504 obtains setting values for transmission and reception in accordance with the module type of the CFP2 module 11, based on the combination of optimal values determined by the optimal value determination unit 503. For example, the optimal value setting unit 504 obtains setting values for the transmitters 112, 802, 805, and 202, and the receivers 113, 801, 806, and 201. Then, the optimal value setting unit 504 sets the obtained setting values to the transmitters 112, 802, 805, and 202, and the receivers 113, 801, 806, and 201.

Thus, in the line card 1A, setting for transmission and reception in the CFP2 module 11, the gear box 80, and the framer 20 is performed in accordance with the surrounding environment in the monitor transmission channel 40, and therefore, stable signal transmission in which bit error generation is not caused at the electrical interfaces 31 and 32 may be realized.

Subsequently, the optimal value setting unit 504 performs processing (S30 to S45) of adjusting setting for transmission and reception in the electrical interfaces 31 and 32, based on an error rate when transmission and reception to and from the CFP2 module 11 is actually performed in performing setting for transmission and reception in the electrical interfaces 31 and 32.

Specifically, the optimal value setting unit 504 obtains a detection result of a detector 1111 of the CFP2 module 11, and checks whether or not there is an error at the CFP2 module 11 side (S30). If an error is not confirmed at the CFP2 module 11 side (No Error in S30), the optimal value setting unit 504 causes the process to proceed to S34. If an error is confirmed at the CFP2 module 11 side (BIT Error detection in S30), the optimal value setting unit 504 detects an error in transmitting data in a CFP2 module 11 direction from the gear box 80 (S31).

Since the confirmed error is an error regarding transmission in the CFP2 module 11 direction from the gear box 80, targets of parameter (setting value) adjustment are the receiver 113 and the transmitter 802. Therefore, the optimal value setting unit 504 performs parameter fine adjustment for the receiver 113 and the transmitter 802 and checks whether or not there is an error at the CFP2 module 11 side again (S32). For example, the parameter fine adjustment is adjustment to a value in a predetermined range using, as median values, the setting values for the receiver 113 and the transmitter 802 in S12. In S32, the optimal value setting unit 504 causes each of the values to consecutively fluctuate in the above-described predetermined range and checks whether or not there is an error at the CFP2 module 11 side.

Subsequently, if a setting value indicating that there is not an error is detected in checking on whether or not there is an error in S32, the optimal value setting unit 504 reports the setting value to the receiver 113 and the transmitter 802 and thus reflects the setting value (S33).

Subsequent to S30 and S33, the optimal value setting unit 504 obtains a detection result of the error checker 8031 of the gear box 80, and checks whether or not there is an error at a gear box 80 side (S34). If an error is not confirmed at the gear box 80 side (No Error in S34), the optimal value setting unit 504 causes the process to proceed to S38. If an error is confirmed at the gear box 80 side (BIT Error detection in S34), the optimal value setting unit 504 detects an error in transmitting data in a gear box 80 direction from the CFP2 module 11 (S35).

Since the confirmed error is an error regarding transmission in the gear box 80 direction from the CFP2 module 11, targets of parameter (setting value) adjustment are the transmitter 112 and the receive 801. Therefore, the optimal value setting unit 504 performs parameter fine adjustment for the transmitter 112 and the receiver 801 and checks whether or not there is an error at the gear box 80 side again (S36). For example, the parameter fine adjustment is adjustment to a value in a predetermined range using, as median values, the setting values for the transmitter 112 and the receiver 801 in S12. In S36, the optimal value setting unit 504 causes each of the values to consecutively fluctuate in the above-described predetermined range and checks whether or not there is an error at the gear box 80 side.

Subsequently, if a setting value indicating that there is not an error is detected in checking on whether or not there is an error in S36, the optimal value setting unit 504 reports the setting value to the transmitter 112 and the receiver 801 and thus reflects the setting value (S37).

Subsequent to S34 and S37, the optimal value setting unit 504 obtains a detection result of the detector 2031 of the framer 20, and checks whether or not there is an error at a line card 1A side (S38). If an error is not confirmed at the line card 1A side (No Error in S38), the optimal value setting unit 504 causes the process to proceed to S42. If an error is confirmed at the line card 1A side (BIT Error detection in S38), the optimal value setting unit 504 detects an error in transmitting data in a line card 1A direction from the gear box 80 (S39).

Since the confirmed error is an error regarding transmission in the line card 1A direction from the gear box 80, targets of parameter (setting value) adjustment are the transmitter 805 and the receiver 201. Therefore, the optimal value setting unit 504 performs parameter fine adjustment for the transmitter 805 and the receiver 201 and checks whether or not there is an error at the line card 1A side again (S40). For example, the parameter fine adjustment is adjustment to a value in a predetermined range using, as median values, the setting values for the transmitter 805 and the receiver 201 in S12. In S40, the optimal value setting unit 504 causes each of the values to consecutively fluctuate in the above-described predetermined range and checks whether or not there is an error at the line card 1A side.

Subsequently, if a setting value indicating that there is not an error is detected in checking on whether or not there is an error in S40, the optimal value setting unit 504 reports the setting value to the transmitter 805 and the receiver 201 and thus reflects the setting value (S41).

Subsequent to S38 and S41, the optimal value setting unit 504 obtains a detection result of the error checker 8032 of the gear box 80, and checks whether or not there is an error at the gear box 80 side (S42). If an error is not confirmed at the gear box 80 side (No Error in S42), the optimal value setting unit 504 ends processing. If an error is confirmed at the gear box 80 side (BIT Error detection in S42), the optimal value setting unit 504 detects an error in transmitting data in the gear box 80 direction from the line card 1A (S43).

Since the confirmed error is an error regarding transmission in the gear box 80 direction from the line card 1A, targets of parameter (setting value) adjustment are the receiver 806 and the transmitter 202. Therefore, the optimal value setting unit 504 performs parameter fine adjustment for the receiver 806 and the transmitter 202 and checks whether or not there is an error at the gear box 80 side again (S44). For example, the parameter fine adjustment is adjustment to a value in a predetermined range using, as median values, the setting values for the receiver 806 and the transmitter 202 in S12. In S44, the optimal value setting unit 504 causes each of the values to consecutively fluctuate in the above-described predetermined range and checks whether or not there is an error at the gear box 80 side.

Subsequently, if a setting value indicating that there is not an error is detected in checking on whether or not there is an error in S44, the optimal value setting unit 504 reports the setting value to the receiver 806 and the transmitter 202 and thus reflects the setting value (S45).

Due to the above-described processing of S30 to S45, the line card 1A may realize more stable signal transmission by performing fine adjustment of setting for transmission and reception in the electrical interfaces 31 and 32.

Third Embodiment

Figure 9:
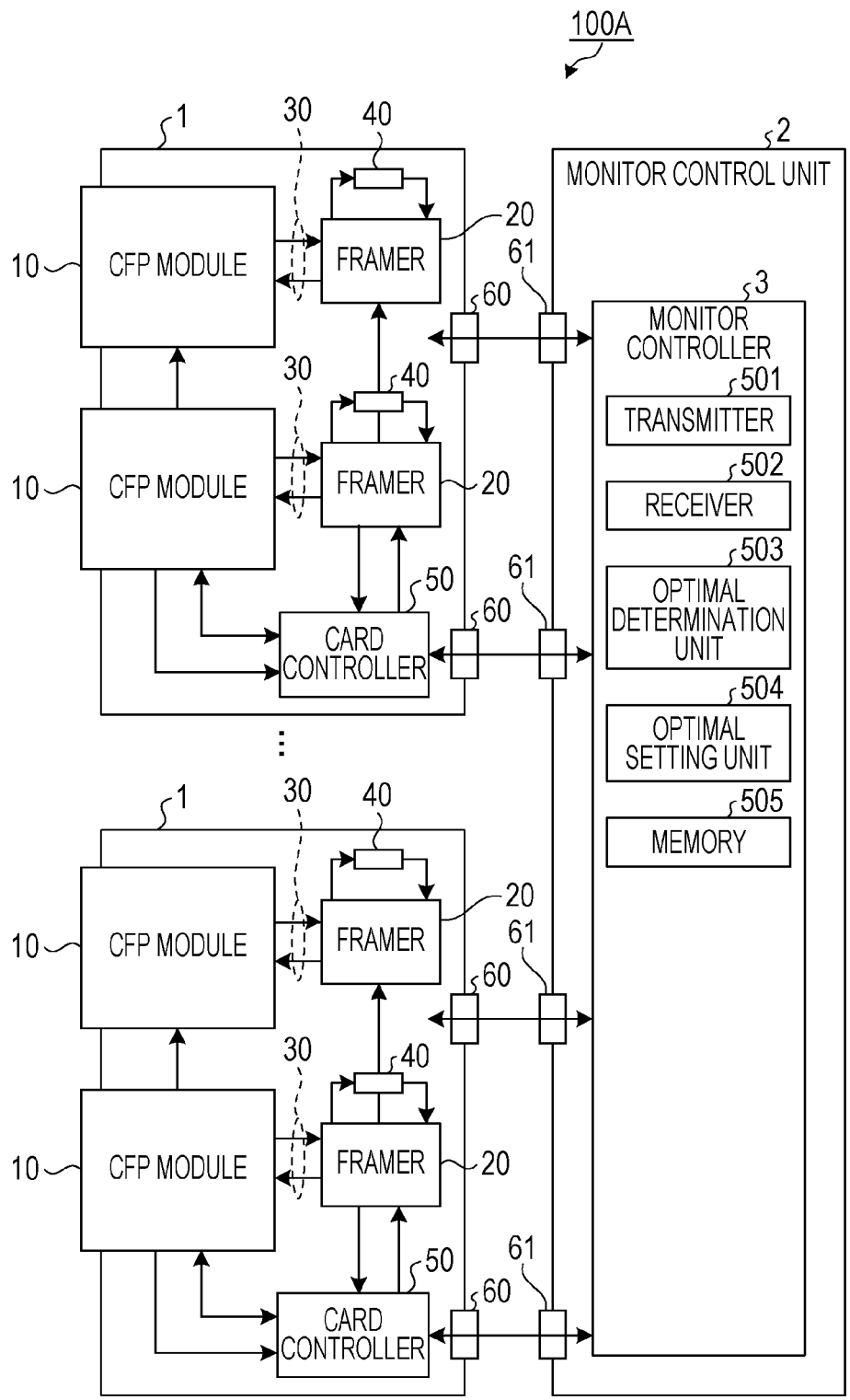
FIG. 9 is a block diagram illustrating a configuration of a transmission apparatus according to a third embodiment.

FIG. 9 is a block diagram illustrating a configuration of a transmission apparatus 100A according to a third embodiment. As illustrated in FIG. 9, the transmission apparatus 100A has a configuration in which setting for transmission and reception in the electrical interface 30 is performed at a monitor control unit 2 side coupled to the line card 1.

Specifically, the transmission apparatus 100A has a configuration in which a monitor control unit 2 including a connection connector 61 and a monitor controller 3 is coupled to the line card 1 via the connection connector 61. The monitor controller 3 includes the transmitter 501, the receiver 502, the optimal value determination unit 503, the optimal value setting unit 504, and the memory 505, and performs, similar to the card controller 50, transmission and reception of the electrical interface 30. Thus, setting for the electrical interface 30 may be performed by an external unit. The monitor transmission channel 40 may be substituted with a transmission channel that provides a connection between the connection connector 60 and the connection connector 61, or the like.

Figure 10:
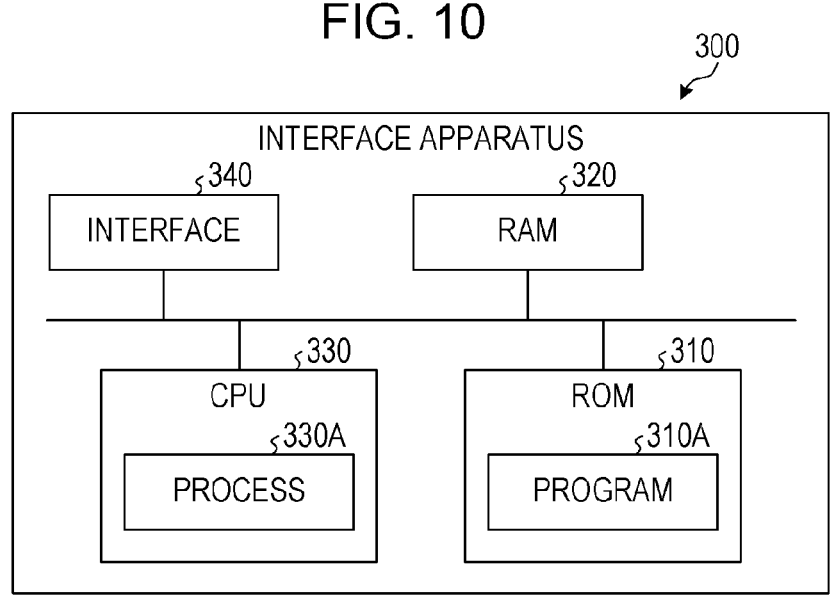
FIG. 10 is a diagram illustrating an example of an interface apparatus that executes a program.
Figure 11:
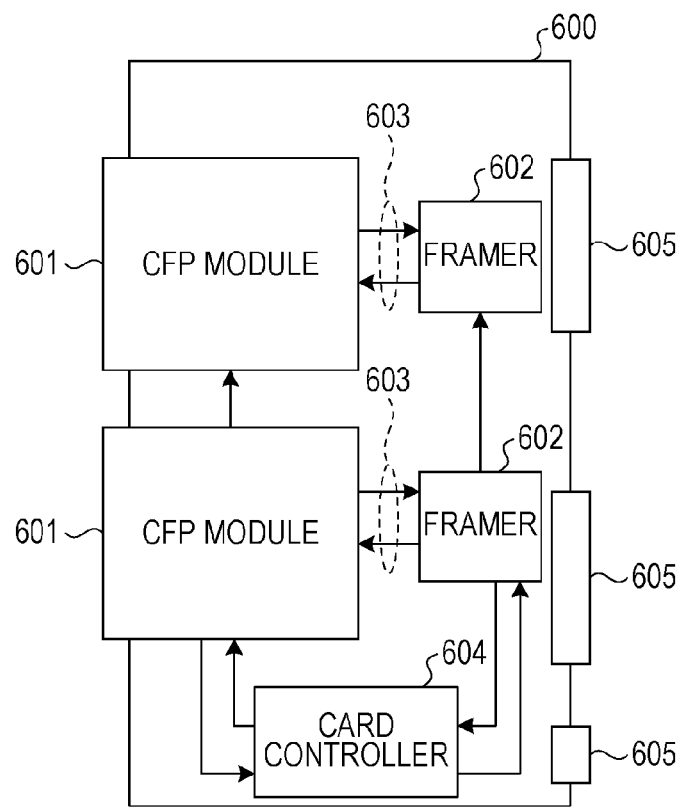
FIG. 11 is a diagram illustrating a related art example of a line card.
Figure 12:
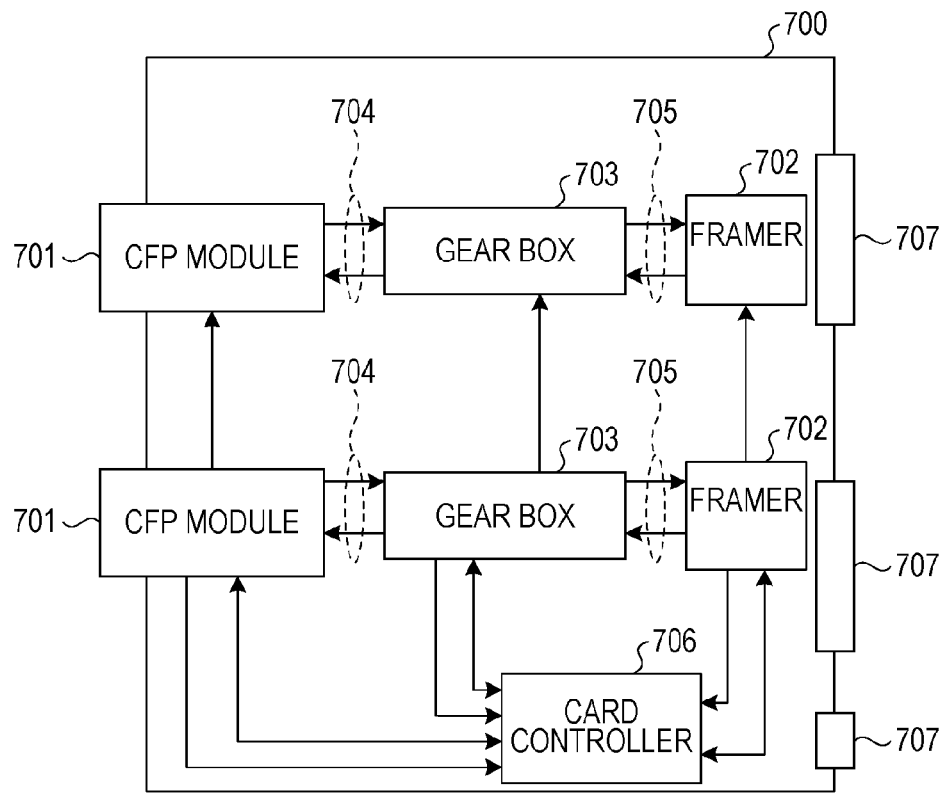
FIG. 12 is a diagram illustrating a related art example of a line card.
Figure 13:
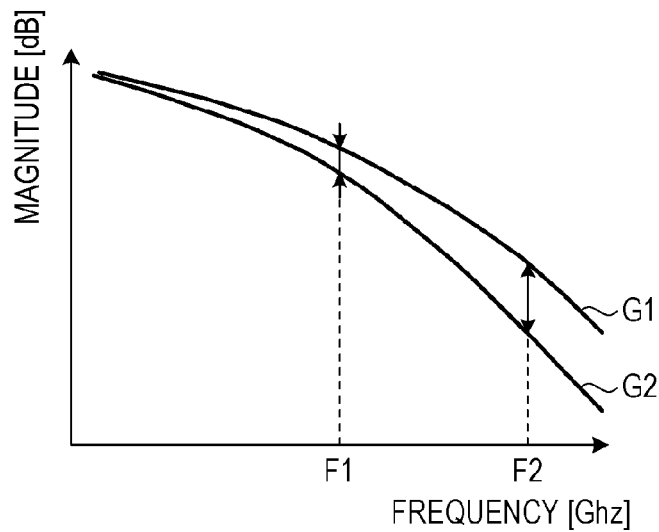
FIG. 13 is a chart illustrating the characteristic of a transmission channel.

Incidentally, each of various types of processing described in this embodiment may be realized by causing an interface apparatus to execute a program prepared in advance. Therefore, an example of the interface apparatus configured to execute a program having similar functions to those in the above-described embodiments will be described below. FIG. 10 is a diagram illustrating an example of an interface apparatus 300 that executes a program.

As illustrated in FIG. 10, the interface apparatus 300 includes a ROM 310, a RAM 320, a CPU 330, and an interface 340.

A program 310A having similar functions to those in the above-described embodiments is stored in advance in the ROM 310. Note that, the program 310A may be recorded in a recording medium from which data may be read by a drive (not illustrated), not in the ROM 310. As the recording medium, for example, a portable recording medium, such as a CD-ROM, a DVD-disk, a USB memory, an SD card, and the like, a semiconductor memory, such as a flash memory and the like, or the like may be used. The program 310A may be integrated or disintegrated, as appropriate.

The CPU 330 reads out the program 310A from the ROM 310, and executes the readout program 310A. Then, the CPU 330 causes the program 310A to function as a process 330A. The process 330A provides similar functions to those of the optimal value determination unit 503 and the optimal value setting unit 504, which have been described above.

A module is not limited to CFP, CFP2, and the like, according to the above-described embodiments, but may be a small form-factor pluggable (SFP) module, a 10G small form-factor pluggable (XFP) module, or the like. Devices (for example, the CFP processors 101 and 202, the receivers 103 and 201, and the like) related to transmission and reception of the electrical interfaces 30, 31, and 32 and transmission rates are not limited to the above-described embodiments. The module may correspond to various devices and transmission rates in electrical or optical transmission.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
   a module configured to receive and transmit data externally, the data received and to be transmitted being transferred via an interface internally;
   a framer configured to process transmission and reception of the data processed by the module;
   a transmission channel on which predetermined data is transmitted and received to and from the framer; and
   a controller configured to determine a combination of setting values for transmission and reception in accordance with a surrounding environment of the transmission channel, based on an error rate when the predetermined data is transmitted and received for each combination of setting values for transmission and reception on the transmission channel, and to perform setting for transmission and reception via the interface, based on the determined combination of setting values for transmission and reception.

2. The transmission apparatus according to claim 1, wherein
   the controller determines, as the combination of setting values for transmission and reception in accordance with a surrounding environment of the transmission channel, a combination, among combinations of setting values for transmission and reception in the transmission channel, with which the error rate is reduced.

3. The transmission apparatus according to claim 1, wherein
   the controller determines a type of the module, and performs setting for transmission and reception via the interface, based on the determined type.

4. The transmission apparatus according to claim 1, wherein
   the controller adjusts setting for transmission and reception via the interface, based on an error rate when the predetermined data is transmitted and received to and from the module via the interface with the setting for transmission and reception via the interface based on the determined combination of setting values for transmission and reception.

5. The transmission apparatus according to claim 1, further comprising:
   a relay unit configured to relay the data of transmission and reception between the module and the framer,
   wherein
   the controller performs setting for transmission and reception between an interface between the module and the relay unit and an interface between the relay unit and the framer, based on the determined combination of setting values for transmission and reception.

6. A line card comprising:
   a module configured to receive and transmit data externally, the data received and to be transmitted being transferred via an interface internally and the module being removable and attachable to the line card;
   a framer configured to process transmission and reception of the data processed by the module;
   a transmission channel on which predetermined data is transmitted and received to and from the framer;
   a controller configured to determine a combination of setting values for transmission and reception in accordance with a surrounding environment of the transmission channel, based on an error rate when the predetermined data is transmitted and received for each combination of setting values for transmission and reception on the transmission channel, and to perform setting for transmission and reception via the interface, based on the determined combination of setting values for transmission and reception.

7. A control method of a transmission apparatus including a module configured to receive and transmit data externally, the data received and to be transmitted being transferred via an interface internally, a framer configured to process transmission and reception of the data processed by the module, a transmission channel on which predetermined data is transmitted and received to and from the framer, and a controller, the control method comprising:
   determining a combination of setting values for transmission and reception in accordance with a surrounding environment of the transmission channel, based on an error rate when the predetermined data is transmitted and received for each combination of setting values for transmission and reception on the transmission channel; and
   performing setting for transmission and reception in the interface, based on the determined combination of setting values for transmission and reception, by the controller.

* * * * *